Feb. 13, 1934.  R. LANQUETIN  1,946,702
APPARATUS FOR INDICATING THE RATIO BETWEEN THE
LINEAR FUNCTION OF TWO TEMPERATURES
Original Filed Sept. 30, 1927   4 Sheets-Sheet 1
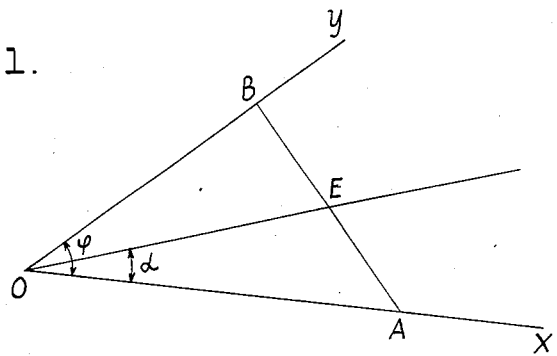
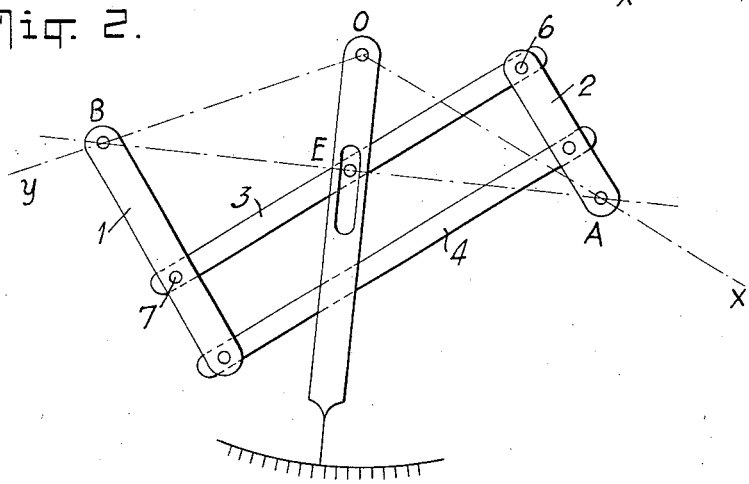
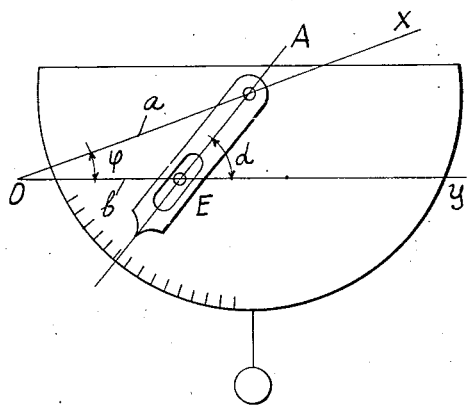
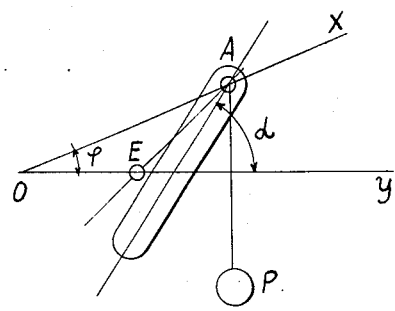
INVENTOR.
ROGER LANQUETIN
BY
*Richards + Geier*
ATTORNEYS.

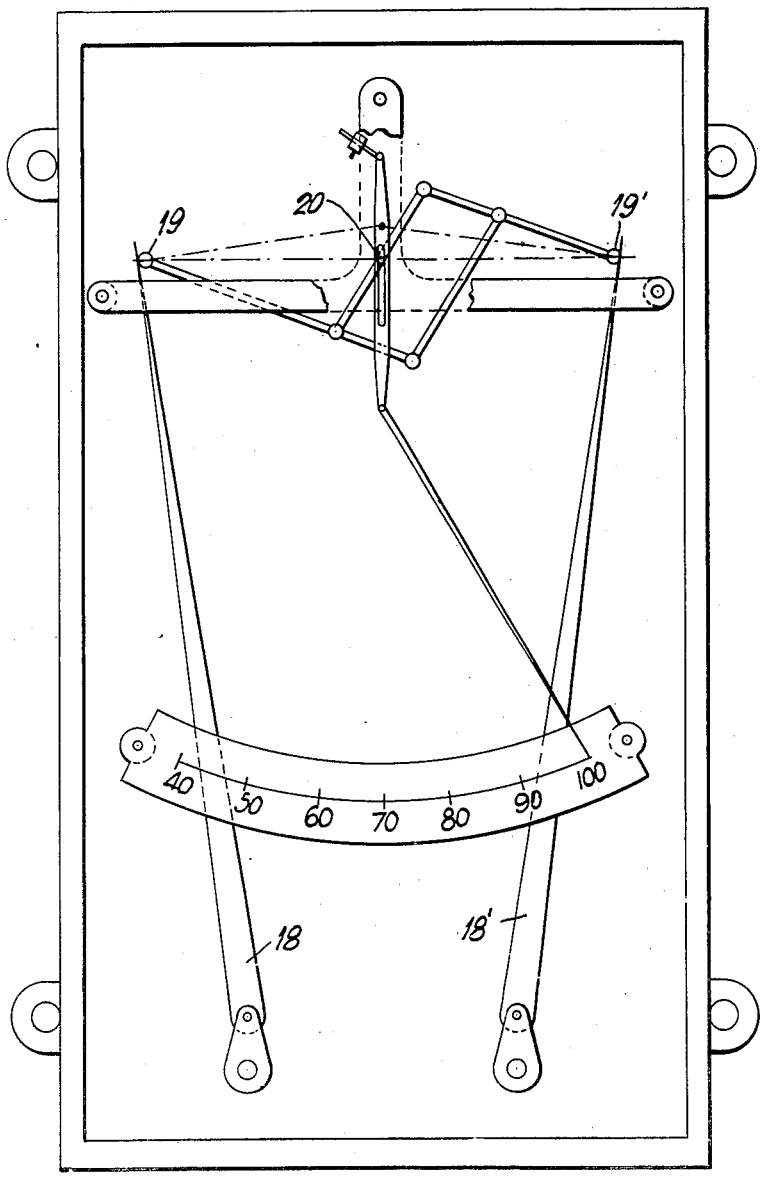

Feb. 13, 1934. R. LANQUETIN 1,946,702
APPARATUS FOR INDICATING THE RATIO BETWEEN THE
LINEAR FUNCTION OF TWO TEMPERATURES
Original Filed Sept. 30, 1927 4 Sheets-Sheet 3
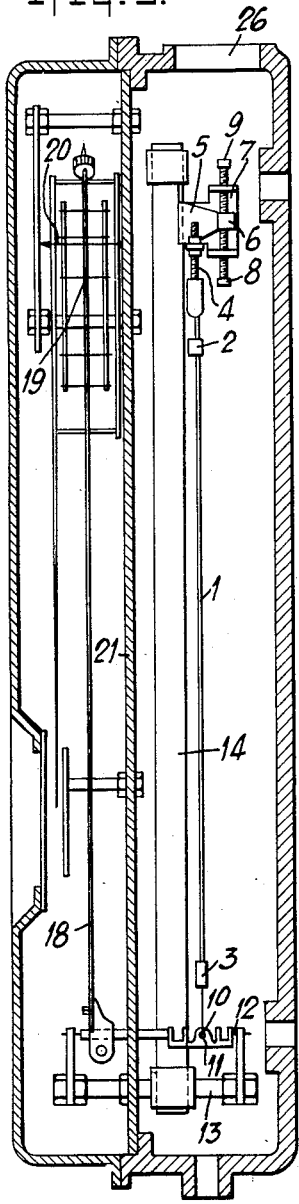
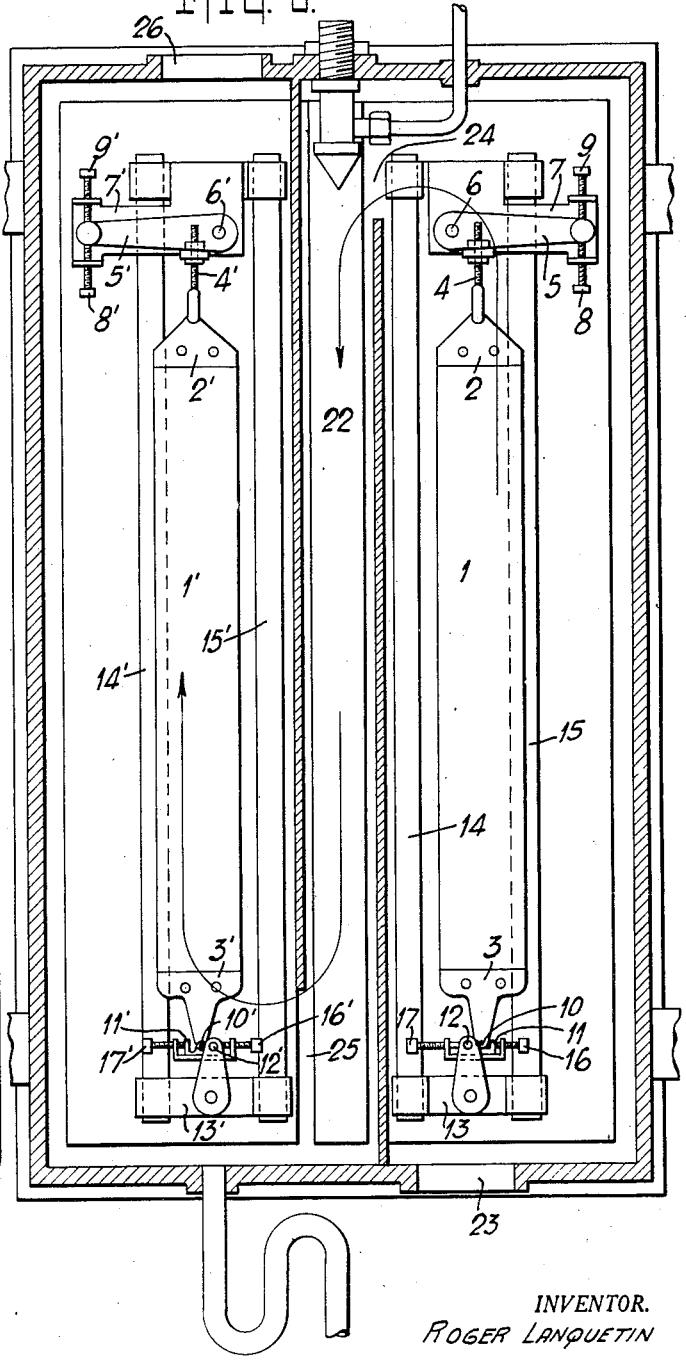
INVENTOR.
ROGER LANQUETIN
BY Richards & Geier
ATTORNEYS.

Feb. 13, 1934.                R. LANQUETIN                1,946,702
         APPARATUS FOR INDICATING THE RATIO BETWEEN THE
              LINEAR FUNCTION OF TWO TEMPERATURES
                  Original Filed Sept. 30, 1927      4 Sheets-Sheet 4

Fig. 7.

INVENTOR.
ROGER LANQUETIN
BY
        Richards & Geier
              ATTORNEYS.

Patented Feb. 13, 1934

1,946,702

UNITED STATES PATENT OFFICE

1,946,702

APPARATUS FOR INDICATING THE RATIO BETWEEN THE LINEAR FUNCTION OF TWO TEMPERATURES

Roger Lanquetin, Neuilly-sur-Seine, France

Original application September 30, 1927, Serial No. 223,118, and in France October 2, 1926. Divided and this application November 1, 1928. Serial No. 316,473

4 Claims. (Cl. 73—24)

This invention relates to improvements in apparatus for indicating the ratio between the linear function of two temperatures and is a division of my application, Serial No. 223,118, filed September 30, 1927.

An object of the present invention is to provide an apparatus for indicating directly the ratio between the linear function of the two temperatures, which may be used, for instance, for indicating the relative humidity.

The above and other objects of this invention may be realized through the provision of a pair of members which are deformable by variations of two different temperatures, for instance the temperatures of the wet bulb thermometer and the dry bulb thermometer; a parallelogram mechanism is connected with the deformable members and is provided with a pointer which is movable over a scale graduated in lengths proportional to the ratio $$\frac{t+K}{t'+K'}$$

wherein $t$ is the temperature of the wet bulb thermometer, $t'$ is the temperature of the dry bulb thermometer and $K$ is a constant.

It has been observed that within certain limits of temperature, the ratio $$\frac{t+K}{t'+K}$$

is practically constant for a given value of the relative humidity if the constants are suitably chosen. For example, the ratio $$\frac{t+14.4}{t'+14.4}$$

for the different values of the relative humidity takes the following values:

| Relative humidity | $\frac{t+14.4}{t'+14.4}$ |
|---|---|
| Percent | |
| 100 | 1 |
| 90 | 0.970 |
| 80 | 8.936 |
| 70 | 0.905 |
| 60 | 0.869 |
| 50 | 0.833 |
| 40 | 0.790 |
| etc. | etc. |

If, then, the scale is graduated in lengths proportional to the ratio $$\frac{t+K}{t'+K},$$

the pointer moving in front of the scale will indicate the relative humidity with a sufficient degree of accuracy.

In the accompanying drawings—

Figure 1 is a diagrammatic view showing the mathematical relationship underlying one form of the invention;

Figure 2 illustrates diagrammatically an apparatus based upon the relationship shown in Figure 1, wherein the relative humidity may be read off directly;

Figures 3 and 3a illustrate diagrammatically two other embodiments of the invention wherein theh ratio between two lengths may be read directly;

Figure 4 is a view of an apparatus embodying the mechanism illustrated in Figure 2;

Figures 5 and 6 are sections of Figure 4 taken at right angles to each other;

Figure 7 is a graph showing the linear relationship between the wet and dry bulb temperatures for the different degrees of humidity.

Referring now to Figure 1, let OX and OY be two convergent straight lines forming between them an angle $\phi$. If we mark upon OX a point A such that the length OA represents a given quantity and upon OY a point B such that the length OB also represents a given quantity; if the points A and B are joined; if the middle E of AB is taken; if OE are joined together and if the angle OE makes with OA is called $\alpha$, we have:

$$\tan \alpha = \frac{\frac{OB}{OA} \sin \phi}{1 + \frac{OB}{OA} \cos \phi};$$

from which it appears that $\phi$ being constant, the direction of OE given by the angle $\alpha$, depends only upon the ratio $$\frac{OB}{OA}.$$

The object of Figure 2 is to make it clear how it is possible to read a ratio between two lengths by the position of a pointer in front of a scale.

This mechanism is composed of a deformable jointed parallelogram, two sides of which are extended in such a way that the length 6A is equal to the length 7B. The point E is the middle of the axis of the bar 3. Whatever be the deformation imposed upon the parallelogram the bar 3 will always be the straight line joining the middle points of the two opposite sides of an imaginary parallelogram having A and B as diagonally opposite vertices. E will always be the centre of this parallelogram and, consequently, the midle of AB.

If the points A and B are constrained to move respectively along two convergent straight lines OX and OY; if a pointer is pivotally guided at E by a pin fixed at E upon the bar 3, from the above explanation, the position of the pointer will depend only upon the ratio $$\frac{OB}{OA}.$$

If the points A and B are displaced in front of graduated scales representing the distances OA and OB or quantities proportional to these lengths, it will be possible to place in front of the pointer a dial graduated in such a way that the position of the pointer indicates directly their ratio,—or a quantity depending only upon this ratio.

Another example of an embodiment of the apparatus enabling a ratio between two lengths to be read may be obtained by means of the mechanism indicated by the diagrammatic view shown in Figure 3.

The cursors A and E move equally upon two convergent straight lines OX and OY forming between them an angle $\phi$.

The cursor A carries a pin upon which is pivoted a pointer. The cursor E carries a stud sliding in a slot formed in the pointer. It follows from this that the pointer will always be directed along the straight line AE. It will make with OY an angle $\alpha$ such that:—

$$\tan \alpha = \frac{\sin \phi}{\frac{b}{a} - \cos \phi}$$

$a$ and $b$ being the distances OA and OE, so that the orientation of the pointer relatively to a fixed direction which is given by the angle $\alpha$ depends only upon the ratio between the two lengths $a$ and $b$. This angle may be measured relatively to the vertical. It will be sufficient for this purpose to place the pointer in front of a dial pivoted about A, which dial will preserve a fixed orientation by means of a weight P.

The mechanism shown in Figure 3 may be simplified. The slot in which slides the stud E may, in fact, be dispensed with (see Figure 3a).

In Figure 3a cursor A carries a pin upon which is pivoted a pointer the orientation of which is preserved by a weight P.

The cursor E is free; its contact with the pointer, in fact, produced for a determined inclination of AE corresponding to a determined relative humidity.

Whether it is with the apparatus shown in Figures 2 or 3, if the displacement of the cursors A and B is produced directly or indirectly in such a way that the distances OA and OB are functions of the two temperatures, for example by the deformation of the parts or members the shape or length of which varies with the temperature, the position of the pointer will indicate the ratio between these functions.

If the parts or members are placed one under the conditions of the dry thermometer, the other under the conditions of the wet thermometer of a psychrometer, the constants of the apparatus may be chosen in such a way that the functions indicated will be the linear functions of $t$ and of $t'$, such as $t+K$ and $t'+K$. The position of the pointer will depend only upon the ratio $$\frac{t+K}{t'+K}$$

and the dial may be graduated so as to indicate directly the relative humidity of the surrounding air.

The temperature of the wet thermometer may be obtained either by saturating the surrounding air by means of a vaporizer working on compressed air or water under pressure, or by surrounding the deformable member with a piece of fabric or a porous material of any kind constantly moistened, or by any other means. The pointer may be provided with a pen and the dial replaced by a movable sheet of paper; the apparatus will thus be made recording.

In a determined position the pointer may act upon a relay and control automatically in this way, the adjustment of apparatus intended to maintain a relative humidity comprised between certain limits.

Figures 4, 5 and 6 illustrate, by way of example, an apparatus embodying the principle of construction shown diagrammatically in Figure 2.

1 and 1' are two plates of an expansible material each gripped between two claws 2—3 and 2'—3'.

The claws 2, 2' carry screw threaded rods 4, 4' connecting them to levers 5, 5' oscillatable about pivots 6, 6' rigid with members 7, 7'. Screws 8, 8' and 9, 9' adapted to screw into screw threaded holes formed in lugs on the members 7, 7' enable the levers 5, 5' to be made to oscillate around the pivots 6, 6'.

The manipulation of nuts screwed on to the rods 4, 4' and of the screws 8, 8' and 9, 9' enables the position in height of the expanding plates 1 and 1' to be adjusted accurately.

The lower claws 3, 3' are adapted to oscillate about the pivots 10, 10' carried by the members 11, 11' which are themselves adapted to oscillate about pivots 12, 12' carried by the members 13, 13' fixed and connected to the members 7 and 7' by bars 14, 15 and 14', 15' of material having a small coefficient of expansion.

Under the action of the variations in temperature the distances from the pivots 10, 10' to the members 7, 7' and the distances from the pivots 12, 12' to the same members, will not vary by the same amount since the variations of the first depend upon the coefficient of expansion of the plates 1 and 1' and those of the second, on the coefficient of expansion of the bars 14, 15 and 14', 15'.

It follows from this that variations in temperature will make the members 11, 11' oscillate about the pivots 12, 12'.

If the variations in temperature are small, if the materials employed have coefficients of expansion which are practically constant within the limits of temperature employed, if the straight line joining the oscillation pivots 10, 12 and 10', 12' remains, in its displacements, practically perpendicular to the direction of the plates 1, 1', it can be admitted, with a sufficient degree of approximation, that the angle made by the members 11, 11' with a fixed straight line is proportional to the temperature.

The distances of the pivots 10, 12 and 10', 12' are adjustable by means of the screws 16, 17 and 16', 17' so as to make it possible to obtain a given variation of position of the members 11, 11' for a given variation in temperature. Bars 18, 18' are rigid with the members 11, 11'. The bars are articulated at the points 19, 19' to a parallelogram mechanism of the type described in connection with Figure 2. The points 19, 19' of these bars describe circles. But if these bars are sufficiently long, the stroke sufficiently small, the arc described approaches a straight line and it can be assumed that the points 19, 19' move on two straight lines.

These two points are the vertices of the above-mentioned parallelogram; the pivotal point of the movable pointer is 20, the point of convergence of the straight lines the parts of which are assumed to be described by 19, 19'. The pointer is broken in such a way as to place the scale symmetrically relatively to the axis of the apparatus.

The apparatus is separated into two parts by a wall 21 through which the parts 11 and 11' pass.

The portion of the apparatus to the rear of the wall 21 (see Figure 6) is itself divided into three chambers. The two end chambers each enclose one of the expansible or deformable members; in the middle one is placed a vaporizer 22 which, at the same time, displaces the air and saturates it with moisture. The air is drawn in through the orifice 23, flows over the expansible member 1, passes through the orifice 24, is saturated with moisture by the vaporizer, issues in a saturated condition through the orifice 25, flows over the expansible member 1' and escapes through the orifice 26.

By suitably choosing the constants of the apparatus and by acting upon the regulating screws 8, 9, 8', 9', 16, 17, 16', 17', the apparatus may be made to indicate the ratio $$\frac{t+K}{t'+K}.$$

From the above description it will be seen that the position of the pointer will only depend upon the relative humidity if the constant is suitably chosen.

What I claim is:

1. Apparatus for indicating directly the relative humidity, comprising in combination, a pair of elongated members deformable by temperature variations, one of said members being adapted to be subjected to temperatures corresponding to the wet bulb thermometer and the other member to temperatures corresponding to the dry bulb thermometer, lower and upper claws gripping said members, means for adjusting the position of said members, said means comprising screw threaded rods connected with said claws, pivots about which said lower claws oscillate, oscillatable members carrying said pivots, bars connected with said oscillatable members, a parallelogram mechanism to which said bars are articulated, a scale, a pointer movable in front of said scale and a pin located midway between the points of connection of said parallelogram mechanism and said bars, said pin being movable by said mechanism and engageable with said pointer to deflect the same.

2. Apparatus for indicating directly the relative humidity, comprising in combination, a pair of elongated members deformable by temperature variations, one of said members being adapted to be subjected to temperatures corresponding to the wet bulb thermometer and the other member to temperatures corresponding to the dry bulb thermometer, lower and upper claws gripping said members, means for adjusting the position of said members, said means comprising screw threaded rods connected with said claws, pivots about which said lower claws oscillate, oscillatable members carrying said pivots, bars connected with said oscillatable members, a parallelogram mechanism to which said bars are articluated, a scale graduated in lengths proportional to the ratio $$\frac{t+K}{t'+K},$$

wherein $t$ is the temperature of the wet thermometer, $t'$ is the temperature of the dry bulb thermometer and K is a constant, a pointer movable in front of said scale and a pin located midway between the points of connection of said parallelogram mechanism and said bars, said pin being movable by said mechanism and engageable with said pointer to deflect the same.

3. Apparatus for indicating directly the relative humidity, comprising in combination, a pair of elongated members deformable by temperature variations, one of said members being adapted to be subjected to temperatures corresponding to the wet bulb thermometer and the other member to temperatures corresponding to the dry bulb thermometer, lower and upper claws gripping said members, means for adjusting the position of said members, said means comprising screw threaded rods connected with said claws, pivots about which said lower claws oscillate, oscillatable members carrying said pivots, bars connected with said oscillatable members, a parallelogram mechanism to which said bars are articulated, said parallelogram comprising vertices adapted to move along convergent straight lines, a pin located midway between the points of connection of said vertices and said bars, a scale and a pointer movable in front of said scale, said pin being movable by said parallelogram mechanism and engageable with said pointer to deflect the same, this deflection being proportional to the ratio of distances of movement of said vertices.

4. Apparatus for indicating relative humidity, comprising in combination, an expansible elongated member adapted to be influenced by the prevailing temperature, an expansible elongated member adapted to be influenced by the temperature of air saturated with moisture, means connected with said members and movable substantially in proportion to the variations of said temperatures, a deformable parallelogram, means for transmitting the movement of the first-mentioned means to said parallelogram, means for adjusting the position of said expansible members, the last-mentioned means being connected with the first-mentioned means, and a pointer connected with and movable by said parallelogram in proportion to the ratio between functions of said temperatures.

ROGER LANQUETIN.